July 4, 1944.  C. A. KOTTERMAN  2,352,640
PLATE RECTIFIER
Filed Nov. 3, 1942

INVENTOR.
CHESTER A. KOTTERMAN
BY D. G. Angus
ATTORNEY

Patented July 4, 1944

2,352,640

UNITED STATES PATENT OFFICE 2,352,640

PLATE RECTIFIER

Chester A. Kotterman, Livingston, N. J., assignor to Federal Telephone & Radio Corporation, New York, N. Y., a corporation of Delaware Application November 3, 1942, Serial No. 464,332

3 Claims. (Cl. 175—366)

This invention relates to rectifiers of the metal plate type and particularly those immersed in fluid such as oil.

The object is to provide an effective means for making electric contact between the rectifier and its connecting element, which will not be impaired by the presence of the fluid.

Metal plate rectifiers such as the selenium type ordinarily comprise a conductive base plate and a layer of the active material such as selenium, adhering to the base plate. When selenium is used as the active material it is suitably heat treated in a well-known manner forming no part of this invention and may undergo other treatments. A counter electrode layer is then ordinarily spread over the surface of the active layer and the two terminals of the rectifier are constituted by the counter electrode and the back of the base plate. A number of these rectifier elements are usually assembled in a stack to provide a complete rectifier, and in the case of the high current rectifying types the stack is sometimes immersed in oil for cooling. In order to make electrical contact, the base plate is ordinarily pressed against a suitable contact or supporting plate to which the electrical terminal is connected. The oil sometimes seeps in between the base plate of the rectifier element and the supporting or contact plate in which it is connected, and when this occurs the electrical connection is sometimes impaired.

In accordance with my invention I overcome the harmful effect of the oil seepage by spot welding the back of the base plate to the contacting plate.

The invention will be better understood from the following detailed description considered in conjunction with the drawing of which Fig. 1 illustrates a plan view of a selenium type rectifier element and Fig. 2 is a sectional view of the rectifier;

Figure 1:
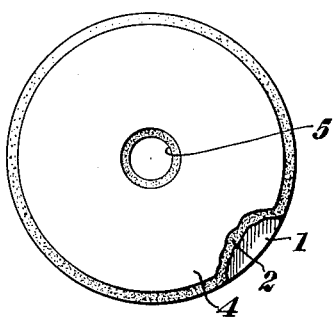
Figure 2:
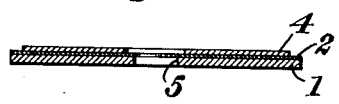

Figs. 1 and 2 show a well-known type of rectifier element such as the selenium type. It comprises a base plate 1 ordinarily of aluminum or of steel, which may be nickel coated if desired, on which is placed a layer of selenium 2. The selenium may be applied in any suitable manner such as by melting amorphous selenium powder and spreading the molten selenium over the base plate and then allowing it to cool and harden. The selenium is then ordinarily annealed in a well-known manner by heating it for a period of time at a temperature below the melting point to induce crystallization and enable the cell to operate properly as a rectifier. This heat treatment can suitably be carried out by first pressing the selenium coated disc in a press and heating it for about a half-hour at a temperature of about 120° C., then removing the pressure and raising the temperature to about 214° C. for a time in the order of one or more hours. The selenium surface may then be treated of desired in any of a number of ways as by fuming selenium dioxide on it and then a counter-electrode 4 is applied over the selenium usually by spreading on a suitable metallic alloy such as Wood's metal or a layer of cadmium, bismuth and tin. When the rectifier is to be stacked on a central mounting spindle or otherwise centrally mounted, it is provided with a central hole 5, and the counterelectrode 4 is spaced somewhat from this central hole as well as from the periphery to avoid short circuits between the counterelectrode 4 and the base plate 1.

On the individual rectifying elements may be positioned if desired on a supporting plate large enough to accommodate the required number of elements.

Although the rectifier is described as the selenium type it should be understood that the invention is applicable to any other plate type, such as the well-known copper oxide type.

In the practice of my invention, I form small protrusions 6 (Fig. 3) of small area at spaced intervals around the periphery of the base plate 1. This may be done by a rap from a pointed punch in a die operation and should be done so that the protrusions project toward the back of the plate as shown in Fig. 4. The area immediately around the plate where the protrusions are to be placed should be left free from the counterelectrode in order to avoid short circuits due to injury to the selenium at this point in the operation. The term "protrusion" as used herein should be understood to mean a relatively small area or pimple projection from the base plate.

Figure 5:
Fig. 5 illustrates the element of Figs. 3 and 4 welded to a contact plate according to this invention.

The base plates 1 are then placed on the plate 7 (Fig. 5). This may be a contact plate for the individual plate 1 or it may be a large supporting plate for a number of rectifier elements. The rectifier element is ordinarily fastened to plate 7 by a suitable fastener, for example, a rivet suitably insulated, passing through hole 5 and a corresponding hole 8 in plate 7.

My invention does not employ a rivet or bolt to fasten the individual rectifying elements to a supporting plate. The individual elements are electrically spot welded to the supporting strip or plate, the number of individual welds per element being determined by the current capacity of a particular element. For illustration purposes, I have shown 3 spot welds, although it is to be understood that more or less welds could be employed without departing from the scope and spirit of the invention. The purpose of the protrusions is to facilitate the spot welding operation. They reduce the area of contact at the point where the spot weld is to be made to a minimum. In this way a large amount of heat is concentrated at a point, thus aiding in the metal fusion necessary for a satisfactory weld and at the same time confines the heat of welding to a limited area so as not to damage the rectifying element itself.

Figure 3:
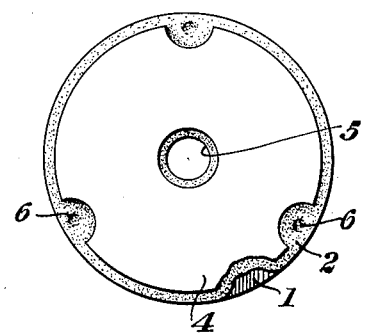
Fig. 3 illustrates a rectifier element provided with protrusions and Fig. 4 is a side view of the element shown in Fig. 3.
Figure 4:
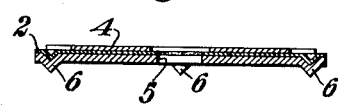
Figure 6:
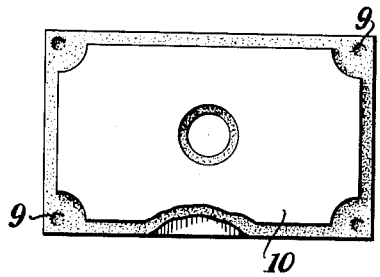
Fig. 6 illustrates another rectifier element having a different shape, similarly provided with protrusions.
Figure 7:
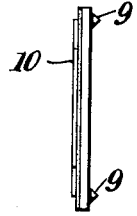
Fig. 7 is a side view of the rectifier of Fig. 6.

This method of welding is not limited to discs of circular form as shown in Figs. 1 and 3 but is useful for every shaped disc or plate. For example, it can be applied to a rectangular shaped base plate as shown in Figs. 6 and 7, wherein the protrusions 9 can be made at the corners, the counterelectrodes 10 being suitably kept away from the corners.

By reason of the welded points at intervals, even if oil should seep in between base plate 1 and the supporting or contact plate 7, the electrical contacts at the protrusions would not be impaired, owing to the welding.

The invention could be adapted to rectifiers placed side by side on a supporting plate or on the other hand could be adapted to rectifier elements in a stack wherein each element is welded to an individual contact.

What is claimed is:

1. In a plate type rectifier, a base plate carrying an active material, a contact plate against which the base plate is held, a protrusion projecting from the base plate to the contact plate and a spot weld at the protrusion.

2. In a plate type rectifier, a base plate carrying an active material, a contact plate against which the base plate is held, said base plate and contact plate being immersed in oil and a protrusion projecting from the base plate and spot welded to the contact plate to maintain electrical contact between the base plate and contact plate in spite of seepage of oil between the plates.

3. The combination of a plate type rectifier comprising a conducting base plate carrying an active material and a counter-electrode over the active material, with a contact plate against which the base plate is held, a protrusion projecting from the base plate to the contact plate and a spot weld at the protrusion, said counter-electrode being omitted from the area of the active material near the protrusion.

CHESTER A. KOTTERMAN.